July 25, 1961  J. B. RUSSELL ET AL  2,994,038
ELECTRICAL LOAD ANTICIPATOR AND RECORDER
Filed June 1, 1959
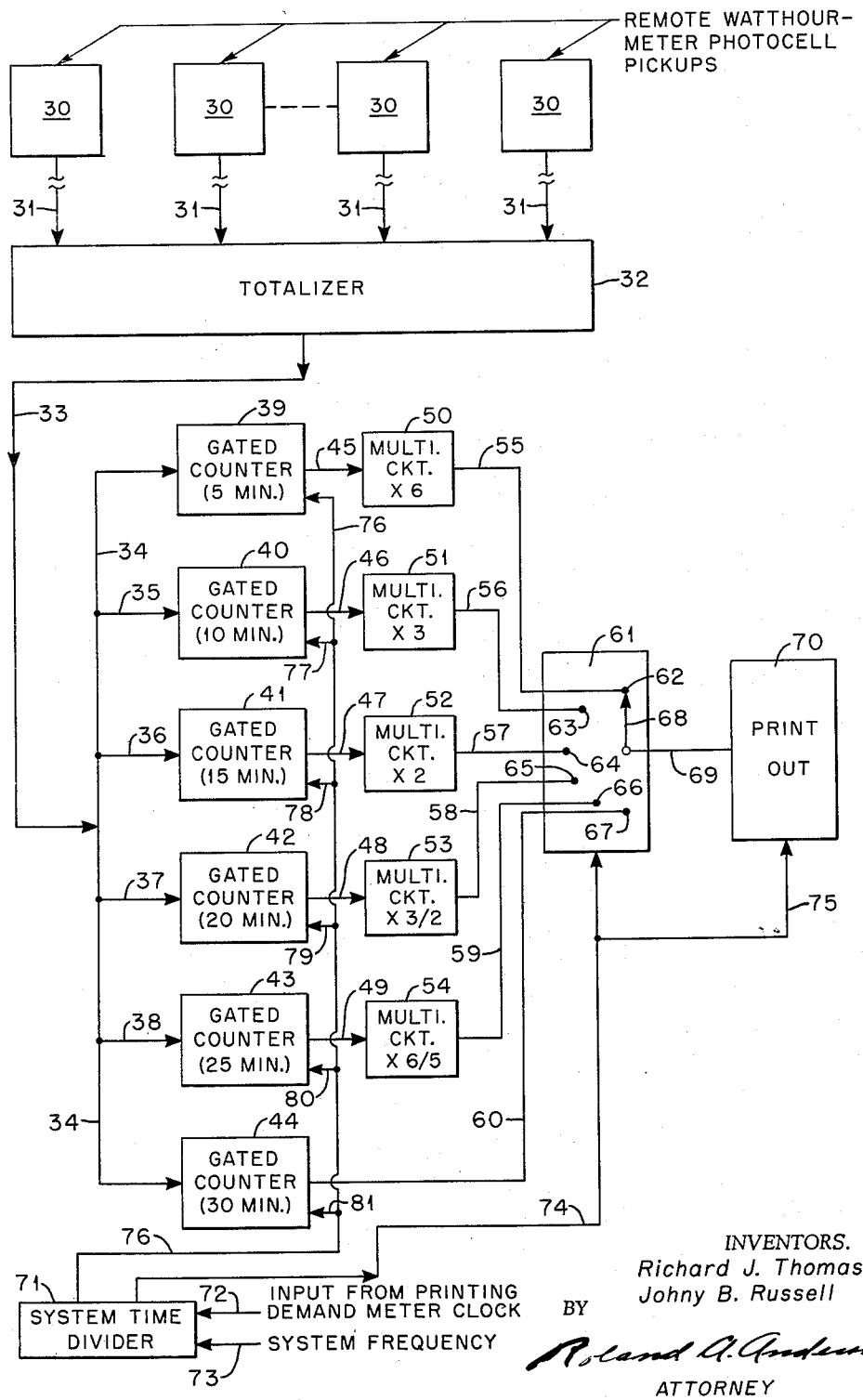
INVENTORS.
Richard J. Thomas
Johny B. Russell
BY
Roland A. Anderson
ATTORNEY 2,994,038
ELECTRICAL LOAD ANTICIPATOR AND RECORDER
Johny B. Russell, Riverside, Calif., and Richard J. Thomas, Paducah, Ky., assignors to the United States of America as represented by the United States Atomic Energy Commission
Filed June 1, 1959, Ser. No. 817,425
1 Claim. (Cl. 324—103)

This invention relates to an improved electrical load anticipator and recorder.

In a typical revenue-metering circuit system for measuring an electrical load, a number of polyphase watthour meters are employed. Each of these meters is connected into one of the transmission lines supplying power to the system. Associated with each of these watthour meters is a printing demand meter. The shaft of each watthour meter is provided with a cam-and-switch arrangement whereby an electrical impulse is fed into its associated demand recorder each time the meter shaft rotates through an angular distance corresponding to some unit, say one megawatthour, of load. The so-called "impulse value" for the system is, therefore, one megawatthour. At the end of a pre-selected demand interval, the demand recorder totalizes the impulses received during the interval.

The system referred to above is subject to at least three disadvantages, each of which becomes increasingly objectionable with the size of the load being metered. One of these disadvantages relates to load "carry-over." Carry-over refers to electrical energy which is used during a given demand interval but which is not registered on the printing demand recorder until the succeeding demand interval. Carry-over occurs whenever the watthour meter is "between impulses" at the moment that the demand interval ends. One reason that carry-over is objectionable is that demand charges are based on the interval of maximum demand.

Another disadvantage is that whenever the printing demand recorder is electrically reset, it is subject to losing any electrical impulses during the reset interval. This action coupled with the "carry-over" action can give a maximum deviation of ±1 megawatthour for each line.

A third disadvantage of the aforementioned system is that during a demand interval the power dispatcher cannot determine the prevailing energy consumption, nor does the system include means for indicating, during a given demand interval, what the demand for the entire interval would be if energy consumption were to continue at the prevailing rate. A more precise knowledge of these two factors—the prevailing energy consumption, and to projected power demand—would enable the power dispatcher to hold the system load closer to 100% load factor. It will be apparent that any loss of impulses or carry-over will interfere with efforts to maintain the load factor at maximum.

With a knowledge of the shortcomings of prior revenue-metering systems, it is a primary object of this invention to provide a system in which load "carry-over" from one demand interval to the next is reduced.

It is another object of this invention to provide a system in which an indication of the prevailing energy consumption in a power metering system and a projected power demand for one demand interval is provided at selected increments of time within the demand interval.

These and other objects and advantages of this invention will become apparent from a consideration of the following detailed specification and the accompanying drawings, wherein the single figure shows a block diagram of a power load anticipator and recording system of this invention.

The above objects have been accomplished in the present invention by utilizing a photoelectric impulse generator or a magnetic type impulse generator, if desired, for each watthour meter in such a manner that two impulses are generated for each revolution of the meter disc thus greatly reducing the amount of carry-over.

For each demand interval, for example, one half-hour, of the system, the total pulses received from all the meters are continuously totaled and they are fed to a plurality of parallel connected gated counters. Each counter has its gate opened at different sub-time intervals during the demand interval. A multiplier is connected to each of said gated counters except the last one and each multiplier is provided with a different multiplier constant so as to provide an estimate of the power to be drawn over the entire demand interval at the end of each of the different sub-time intervals. Means are provided for recording the outputs from the different circuits in synchronism with the actuation of each gate circuit. It should be understood that the system set forth herein may be adapted to operate for any desired demand interval and is not limited to a specific half-hour demand interval, or to specific sub-intervals within a demand interval.

Referring now to the drawing, there is illustrated one embodiment in which the principles of this invention may be carried out. A plurality of remote watthour-meter photocell pickups 30 are connected by lines 31 to a totalizer 32. The photocell pickups generate square waves which are amplified by means, not shown, and transmitted to totalizer 32. The totalizer 32 then converts the square waves from pickups 30 into compatible pulses still in random or real time. The totalizer then serializes or converts the random entry of the pulses to serial entry in synchronism with the "clock frequency" of the system. Next, the pulses are corrected so that each pulse which is worth .112 megawatthour, is corrected to finally be equal to .1 megawatthour per pulse.

The output from totalizer 32 is connected to a plurality of parallel connected gated counters 39, 40, 41, 42, 43, 44, by lines 33, 34 to counter 39, lines 33, 34, 35 to counter 40, lines 33, 34, 36 to counter 41, lines 33, 34, 37 to counter 42, lines 33, 34, 38 to counter 43, and lines 33, 34 to counter 44. The gate associated with counter 39 is opened after a demand sub-interval of 5 minutes, and the output from counter 39 is fed by a line 45 to a multiplier 50 having a multiplier constant of six. The gate associated with counter 40 is opened after a demand sub-interval of 10 minutes, and the output of counter 40 is fed by a line 46 to a multiplier 51 having a multiplier constant of three. The gate associated with counter 41 is opened after a demand sub-interval of 15 minutes, and the output therefrom is fed by a line 47 to a multiplier 52 having a multiplier constant of two. The gate associated with counter 42 is opened after a demand sub-interval of 20 minutes, and the output therefrom is fed by a line 48 to a multiplier 53 having a multiplier constant of 3/2. The gate associated with counter 43 is opened after a demand sub-interval of 25 minutes, and the output therefrom is fed by a line 49 to a multiplier 54 having a multiplier constant of 6/5. The multipliers 50, 51, 52, 53, 54 thus provide an output which is an estimate of the energy consumption at the end of each sub-interval for the entire demand interval based upon the prevailing energy consumption during each demand sub-interval. The gate associated with counter 44 is opened at the end of the half-hour demand interval and the output therefrom is the actual amount of energy consumed during the demand interval.

The outputs from multipliers 50, 51, 52, 53, 54, and counter 44 are fed by lines 55, 56, 57, 58, 59, and 60, respectively, to contact points 62, 63, 64, 65, 66, and 67, respectively, of the switching unit 61. Switching unit 61 is also provided with a switching contact arm 68, and an output line 69 connected to this arm 68. Line 69 is connected to a recording print-out unit 70. The switching unit 61 is arranged to sequentially connect the outputs from multipliers 50, 51, 52, 53, 54, and counter 44 to the input of print-out unit 70, in synchronism with the opening of the gate circuits associated with counters 39–44.

A system time divider 71 is provided for controlling the gates in units 39, 40, 41, 42, 43, 44, the switching unit 61, and print-out 70. Also, unit 71 is used for resetting the switching unit 6 and all the counter gate circuits at the end of each demand interval so that the system is then ready to meter a new demand interval. An input from a printing demand meter clock is fed through line 72 to unit 71, and an input from the system frequency is fed through line 73 to unit 71. Unit 71 is connected by line 74 to switching unit 61, and by lines 74 and 75 to the print-out unit 70. Unit 71 is also connected by line 76 to unit 39, by lines 76 and 77 to unit 40, by lines 76 and 78 to unit 41, by lines 76 and 79 to unit 42, by lines 76 and 80 to unit 43, and by lines 76 and 81 to unit 44.

Five sub-interval calculating increments were chosen so that during the one half-hour interval, the operator will have five opportunities of altering the load schedule in a manner so as to approach the 100% load factor, that is, at 5 minutes, 10 minutes, 15 minutes, etc. The data printed by the above system is actually a predicted value, the calculation of which is based on the energy consumed within each sub-interval, means are provided in the totalizer which provides a net total of positive pulses accumulated, since some of the watthour meters connected to the system may be of the type which are capable of rotating in either direction.

In the above system, the predicted energy consumption is recorded in terms of megawatthour. It should be understood that the system may be modified to record any increment of power representing energy, i.e., kilowatthours, and watt-hours.

The above system lends itself to manual alteration of the load schedule at the end of each demand sub-interval in such a manner so as to approach the 100% load factor, or this may be accomplished automatically by means, not shown.

This invention has been described by way of illustration rather than limitation, and it should be apparent that the invention is equally applicable in fields other than those described.

What is claimed is:

A power load anticipator and recording system for a plurality of power lines and for a predetermined power demand interval, comprising a watt-hour meter connected in each of said lines, an impulse generator actuated by each of said meters and providing an output of pulses proportional to the amount of energy used on each said line, a totalizer having a plurality of input lines and a single output, circuit means connecting the outputs of said impulse generators to the input lines of said totalizer, a plurality of parallel-connected counters, means connecting the output of said totalizer to each of said counters, each of said counters being provided with a gate circuit, means for energizing each of said gate circuits at different sub-time intervals during said demand interval to thereby provide successive outputs from said counters, multiplying means connected to each of said gated counters except the last counter, each of said multiplying means having a different multiplying constant to thereby provide an output which is an estimate of the power to be drawn over the entire demand interval, a recorder, means for sequentially switching each output from each of said multipliers and said last counter to the input of said recorder in synchronism with the actuation of each of said gate circuits, and means connected to said switching unit and to said gate circuits to reset said switching unit and said gate circuits at the end of said demand interval to thereby begin a new demand interval.

References Cited in the file of this patent

UNITED STATES PATENTS

| | | |
|---|---|---|
| 1,809,269 | Gaarz | June 9, 1931 |
| 2,568,755 | McWhirter | Sept. 25, 1951 |